Feb. 15, 1966      D. D. CAHN      3,234,925

ENGINE VAPOR RECYCLE SYSTEM

Filed March 23, 1964

DAVID D. CAHN
INVENTOR.

BY D. Carr Richards

ATTORNEY

3,234,925
ENGINE VAPOR RECYCLE SYSTEM
David D. Cahn, 318 N. Pearl St., Dallas, Tex.
Filed Mar. 23, 1964, Ser. No. 353,729
7 Claims. (Cl. 123—119)

This invention relates to the recovery of vapors in crank cases of automobile or truck-type engines, and more particularly to a split system in which a separator comprises a closure for an engine oil fill pipe.

The increase in automobile population and the problem they produce by generating smog has led to the enactment of legislation in many jurisdictions requiring installation of appliances which will minimize the exhaust into the atmosphere of unexpended fuel constituents and of poisonous or irritating by-products resulting from improper combustions. Exhaust products from a crank case of an internal engine contain burned and unburned fuel. As automobile engines wear, the efficiency of the engine decreases by reason of loss of compression in the engine. On the intake cycle of the piston, an air-fuel mixture is drawn into the cylinder and is compressed and fired, resulting in an explosion. Part of the gas formed by the explosion is forced through the annulus between the piston and the cylinder into the crank case. Such gas contains both products of combustion and unburned portions of the fuel mixture. Ordinarily, the gas thus escaping from the piston is permitted to escape from the crank case by way of crank case vents and road draft tubes. Part of the constituents which escape from the crank case are due to vaporization of crank case oil.

The present invention is directed to a new and improved system for eliminating the escape into the atmosphere of undesirable fuel constituents and by-products. More particularly, in accordance with the invention, there is provided an engine system in which crank case vents and road draft tubes are plugged and in which a filter unit is provided as a cap for the oil fill pipe. The filter includes an enlarged chamber connected to the oil fill pipe with a first flow channel leading from the chamber to the intake manifold on the engine. A second flow channel is connected from the chamber to the atmospheric side of the air filter on the engine. In the first flow channel there is provided a meter orifice to meter the flow of gases into the intake manifold.

In a further aspect of the invention, there is provided a sealed oil fill cap in the form of a cylinder of diameter substantially larger than the diameter of the oil fill flow channel. A laterally directed tube extends from one side of the cylinder and extends to the intake manifold and includes therein an orifice of fixed size for control of unexpended gases delivered to the manifold. A second tube extends from the top of the cylinder to the atmospheric side of the air filter of the engine. By this means, which all other vents leading to the crank case closed, there is provided a completely closed system which will prevent the delivery or escape to the atmosphere of any vapors in the crank case.

For a more complete understanding of the present invention and for further objects and advantages thereof, reference may now be had to the following description taken in conjunction with the accompanying drawings in which.

Figure 1:
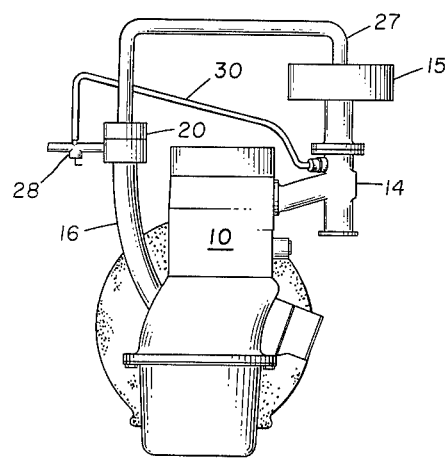
FIGURE 1 is a diagram illustrating one embodiment of the invention applied to an engine.
Figure 2:
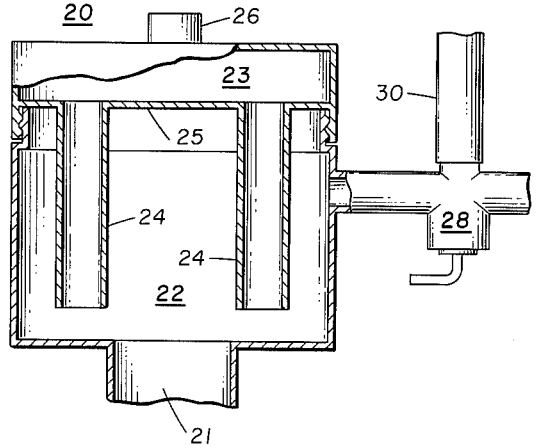
FIGURE 2 is a sectional view of one embodiment of the invention.

Referring now to FIGURES 1 and 2, there is illustrated an engine 10. The engine is provided with an air cleaner or air filter 15 through which air must pass to reach the carburetor 14.

An oil fill pipe 16 is provided on engines, in a variety of locations. In accordance with the present invention, a filter 20, a cylindrical unit having a bayonet connector at the lower end thereof, fits into and provides a seal for the fill pipe 16. The lower end of the filter 20 will be made in a variety of configurations so that it will fit securely onto the oil fill inlet of any engine. As best seen in FIGURE 2, the filter 20 is divided into two chambers 22 and 23. The lower chamber 22 is an enlarged chamber wherein oil vapor traveling upward through the channel 21 is of reduced velocity, so that vapor constituents therein will fall out and will drain back into the crank case. A pair of tubes 24 communicate through the baffle 25 which separates chamber 22 from chamber 23. As shown in FIGURE 1, the upper chamber 23 is then connected by way of a channel 26 and a tube 27 to the atmospheric port or intake for the air filter 15.

A second flow channel including the fitting 28 is connected to the lower chamber 22 in the side wall of the filter 20. The fitting 28 is provided with a restriction or orifice therein through which gases may pass to a tube 30 which leads to the intake manifold on the engine 10. Thus, there is a divided flow system for the delivery of vapor or air from the crank case into the combustion zone of the engine. The first flow channel leads by way of line 27 into the air cleaner. The second flow channel leads by way of line 30 into the intake manifold.

In practice, any road draft tube and crank case vent are plugged to form a closed system so that there can be no escape from the crank case to the atmosphere of undesirable constituents. All crank case vapor must pass through the piston and be subjected to the complete combustion cycle in the engine cylinder in order to escape the engine. The escape can be only by way of the engine exhaust. By this means, there is eliminated any contamination of the atmosphere by escape from the crank case of undesirable constituents.

Figure 3:
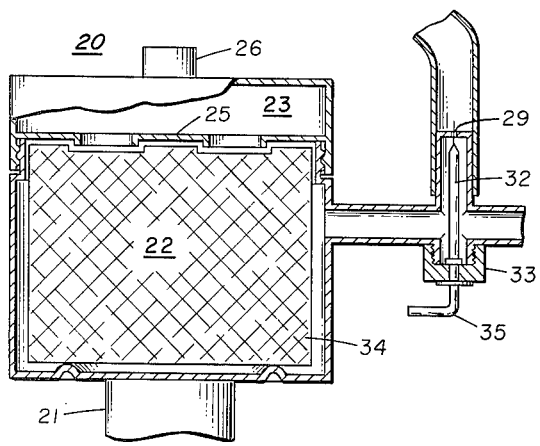
FIGURE 3 is a view partially in section of the unit 20 of FIGURE 1.

FIGURE 3 illustrates a modification of the invention. In this modification, the baffle 25 is a flat plate having a pair of apertures extending therethrough. The chamber 22 is filled with a fire-stop material, such as steel wool, which assists not only in prevention of an explosion in the engine, but also assists in the removal of liquid constituents from the vapor flowing upwardly from the crank case. In this case, the upper chamber 23 is formed by the lid or cap portion wich is releasably secured onto the upwardly facing cup which forms the lower zone 22. A filter element 34 is placed in the lower zone 22. Thus, vapor must pass through the filter element 34 and through the apertures in the plate 25 before traveling through the outlet 26. The connection between the cap and the cup in the system of FIGURE 3 is a vapor-tight connection so that all vapors traveling upwardly into the system must pass through the air filter or through the intake manifold. No escape is permitted directly to the atmosphere.

As shown in FIGURE 3, the fitting 28 has an orifice 29 through which gas traveling to the carburetor intake must pass. It has been found that the orifice 29 has a tendency to become clogged. In accordance with the present invention, there is provided a cleaner element 32 which extends through a cap 33 into the fitting 28 so that it can be manually operated by handle 35 at periodic intervals to clean any debris which may tend to lodge in the orifice 29.

By providing the system of the type illustrated in FIGURES 1–3, the system is adaptable to existing manifold fittings. It has no moving parts. It has a flame arrestor built into it. Water and oil separation is also assured.

Its use has no effect in carburetion over that existing in the normal engine. Freeze-up in the air cleaner is prevented. The system is interchangeable with existing oil fill caps and provides a system completely closed for the crank case and thus prevents the entry of dirt into the crank case and stops minor oil leaks. Further, no tools are necessary for cleaning or servicing the unit.

Figure 4:
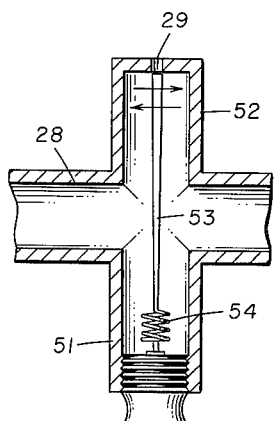
FIGURE 4 is an enlarged sectional view of a modification of the control of FIGURE 3.

In FIGURE 4 there is illustrated a modification in which the orifice 29 is automatically cleaned. In this embodiment, a plug 50 is adapted to be screwed into a fitting section 51 which is axially aligned with the section 52 in which the orifice is positioned. The plug 50 is provided with a thin flat steel spring 53 which is mounted at its base by a coil spring 54 which is supported on the plug 50. This spring 53 has its upper end closely adjacent to the wall through which the orifice 29 passes. As a vehicle on which motor 10 is mounted travels over a roadway, the spring 53 will vibrate past the orifice and will keep the orifice clear from deposit of particles on the upstream side of the orifice. Thus, such a provision may be employed in place of the manual cleaner 32 of FIGURE 2.

While the spring 54 is primarily to permit the rod 53 to vibrate laterally, it is to be understood that the spring or the rod 53 may be so constructed as to permit axial vibration. In such case, the end of the rod may be permitted to extend through orifice 29 and vibrate axially as well as laterally for cleaning purposes.

From the foregoing, it will be seen that a closure member is provided for an oil fill port of an internal combustion engine. The closure member preferably is a two-part device in which a cover is fitted onto a lower part as by a bayonet-type latch, by a threaded connection, or by friction. The latter is preferred to permit ready access for servicing or where it is necessary to add oil to the engine.

The closure member forms a chamber having a pierced baffle dividing the chamber into two compartments, with the fill pipe flow-connected to one of the compartments. A flow line leads from the same compartment as the fill pipe to the intake manifold of the engine with a restricting orifice therein which controls flow to the intake manifold. A flow channel, leading from the other compartment to the air intake port, leads to the carburetor. Thus, no vapor can escape from the crank case to the atmosphere without passing through the combustion chamber and being subject to combustion in the engine itself. The device is adapted to seal and to close the oil fill pipe of the engine.

Having described the invention in connection with certain specific embodiments thereof, it is to be understood that further modifications may now suggest themselves to those skilled in the art and it is intended to cover such modifications as fall within the scope of the appended claims.

What is claimed is:
1. In a system for control of vapors from an internal combustion engine which is sealed except for an oil fill port, the combination which comprises:
   (a) a sealing cap for said port forming a closed chamber communicating with said port,
   (b) a pierced baffle dividing said chamber into two compartments,
   (c) a carburetor air supply line leading from one of said compartments, and
   (d) an intake manifold line having a restricted orifice therein leading from the other of said compartments.

2. The combination set forth in claim 1 in which said baffle is horizontal and the compartment below said baffle is filled with fibrous material through which the vapors must pass to reach the upper compartment.

3. The combination set forth in claim 1 in which said baffle is horizontal and the compartment below said baffle is filled with a removable fibrous filler through which the vapors must pass to reach the upper compartment.

4. The combination set forth in claim 1 in which said baffle extends horizontally with at least one downwardly extending tubular member through which vapors must travel in passing from the lower compartment to the upper compartment.

5. The combination set forth in claim 1 in which said sealing cap is formed of two parts secured together by friction means with a coupling means for engaging and sealing said cap in said port.

6. In a system for control of vapors from the crank case of an internal combustion engine having an intake manifold, a carburetor air supply port, and a crank case which is sealed except for a fill pipe, the combination which comprises:
   (a) a filter structure forming a chamber and having a means to be inserted into said fill pipe forming a flow channel leading from said fill pipe to said chamber,
   (b) a pierced baffle dividing said chamber into two compartments,
   (c) a first flow channel leading from one of said compartments to said air supply port, and
   (d) a second flow channel having a restricted orifice therein leading from the other of said compartments to said intake manifold.

7. In a system for control of vapors from the crank case of an internal combustion engine having an intake manifold, a carburetor air supply port, and a crank case which is sealed except for a fill pipe, the combination which comprises:
   (a) a filter structure forming a chamber with an inlet for insertion into said fill pipe,
   (b) a pierced baffle extending generally horizontally across said chamber for dividing said chamber into two compartments,
   (c) a first flow channel leading from the compartment opposite said inlet to said air supply port, and
   (d) a second flow channel having a restricted orifice therein leading from the other of said compartments to said intake manifold.

References Cited by the Examiner

UNITED STATES PATENTS

| 2,462,634 | 2/1949 | Griffith | 123—119 |
| 3,157,171 | 11/1964 | Smith | 123—119 |
| 3,172,399 | 3/1965 | Lentz | 123—119 |
| 3,179,095 | 4/1965 | Linn | 123—119 |

KARL J. ALBRECHT, *Primary Examiner.*